(12) United States Patent
Rinsma

(10) Patent No.: US 6,311,807 B1
(45) Date of Patent: Nov. 6, 2001

(54) BRAKE CALLIPER WITH WEAR COMPENSATION

(75) Inventor: Andries Christian Rinsma, Leeuwarden (NL)

(73) Assignee: SKF Engineering and Research Centre B.V., Nieuwegein (NL)

( * ) Notice: Subject to any disclaimer, the term of this patent is extended or adjusted under 35 U.S.C. 154(b) by 0 days.

(21) Appl. No.: 09/462,124

(22) PCT Filed: Jul. 10, 1998

(86) PCT No.: PCT/NL98/00403

§ 371 Date: Dec. 27, 1999

§ 102(e) Date: Dec. 27, 1999

(87) PCT Pub. No.: WO99/02885

PCT Pub. Date: Jan. 21, 1999

(30) Foreign Application Priority Data

Jul. 10, 1997 (NL) .................................................. 1006542

(51) Int. Cl.[7] .................................................. F16D 55/02
(52) U.S. Cl. ........................ 188/71.9; 188/72.7; 188/156; 188/196 B
(58) Field of Search .................... 188/71.7, 71.8, 188/71.9, 72.1, 72.7, 72.8, 157, 158, 156, 196 V, 196 D, 196 B, 196 BA

(56) References Cited

U.S. PATENT DOCUMENTS

| | | | |
|---|---|---|---|
| 3,653,470 | * | 4/1972 | Travis .................................. 188/71.9 |
| 3,885,653 | * | 5/1975 | Farr ...................................... 188/71.9 |
| 3,952,844 | * | 4/1976 | Newstead et al. ................... 188/72.8 |
| 3,991,859 | * | 11/1976 | Coulter et al. ....................... 188/71.9 |
| 3,999,638 | * | 12/1976 | Margetts .............................. 188/71.9 |
| 4,031,985 | * | 6/1977 | Ito ........................................ 188/71.9 |
| 4,180,146 | * | 12/1979 | Airheart .............................. 188/71.8 |
| 4,321,986 | * | 3/1982 | Thistleton ............................ 188/71.9 |
| 4,399,894 | * | 8/1983 | Tribe .................................... 188/71.9 |
| 4,553,643 | | 11/1985 | Wilcox . |
| 4,721,190 | * | 1/1988 | Schmidt et al. ..................... 188/71.9 |
| 5,000,294 | * | 3/1991 | Hunnicutt et al. .................. 188/71.9 |
| 5,038,895 | * | 8/1991 | Evans .................................. 188/72.7 |
| 5,086,884 | * | 2/1992 | Gordon et al. ....................... 188/71.9 |
| 5,086,885 | * | 2/1992 | Bowsher .............................. 188/71.9 |
| 5,788,023 | * | 8/1998 | Schoner et al. ..................... 188/72.7 |
| 5,931,268 | * | 8/1999 | Kingston et al. ..................... 188/162 |

FOREIGN PATENT DOCUMENTS

| | | |
|---|---|---|
| 1 655 401 | 4/1971 | (DE) . |
| 195 21 401 C1 | 1/1997 | (DE) . |
| 195 36 695 A1 | 4/1997 | (DE) . |
| 2 590 219 | 5/1987 | (FR) . |
| 1 303 133 | 1/1973 | (GB) . |

* cited by examiner

Primary Examiner—Robert J. Oberleitner
Assistant Examiner—Devon Kramer
(74) Attorney, Agent, or Firm—Oliff & Berridge, PLC

(57) ABSTRACT

A brake calliper for a disc brake comprises a yoke carrying a pair of opposite brake pads and an electric actuating mechanism connected to the yoke, the actuating mechanism engaging a displaceable support member for displacing the brake pads towards and from each other. The actuating mechanism is driveable over a first range of rotations as well as over a second range of rotations, one of which ranges being for displacing the pads towards and from each other for exerting a braking effect on an associated brake disc, and the other range of which being for wear compensation of the pads.

17 Claims, 2 Drawing Sheets

BRAKE CALLIPER WITH WEAR COMPENSATION

BACKGROUND OF THE INVENTION

1. Field of the Invention

The invention is related to a brake calliper for a disc brake, comprising a yoke carrying a pair of opposite brake pads and an actuating mechanism connected to said yoke, said actuating mechanism engaging a displaceable support member for displacing the brake pads towards and from each other, wherein the actuating mechanism is driveable over a first range of rotations as well as over a second range of rotations, one of which ranges being for displacing the pads towards and from each other for exerting a braking effect on an associated brake disc, and the other range of which being for wear compensation of the pads.

Such a brake calliper is known from GB-A-1 303 133.

2. Description of Related Art

In service, the brake pads gradually wear down which means that the screw mechanism will have to be rotated over more revolutions before the desired braking effect is obtained. From a point of view of proper brake behaviour, it is however desirable to maintain a desired air gap between the brake pads on the one hand, and the brake disc on the other hand. As an example, a desired air gap of about 0.2 mm is usually preferred.

Due to wear however, the air gap may become much larger, e.g. in the order of about 20 mm, and therefore a larger stroke will be required to engage the brake disc. Such magnitude of the air gap is less desirable, as it impairs the proper functioning of the brake.

Said prior art actuator comprises a ramp-raceway mechanism, which allows a predefined maximum axial travel of the brake pads. Once this maximal travel is reached, a screw-threaded compensator can be activated for diminishing the play.

SUMMARY OF THE INVENTION

Said ramp-raceway mechanism as well as the compensator is activated by a rotational movement in one and the same direction. The control possibilities of said actuator are therefore limited: the compensator can only be activated after a predefined amount of play has been reached. The object of the invention is to provide an actuator of this kind, which can be controlled in a more flexible way. This object is achieved in that the first range of rotations has a starting rotation in one rotating direction, and the second range of rotations has a starting rotation in the opposite direction.

According to an important aspect of the invention, the actuators are controlled independently from each other.

By means of a control device which may control the compensating and normal braking actions, it is possible to start a compensating action for compensating brake pad wear, independently from the normal braking actions.

Generally, the wear compensation will only be activated once the deviation from the ideal air gap has become too large. However, said compensation will not occur in an automatic, unavailable way, but can be controlled as desired, i.e. after a small or large wear increment in the air gap. In summary, the actuating mechanism is rotatable over a first range of rotations for obtaining a braking effect, and over a second range of rotating for obtaining a compensation effect.

The electric actuating mechanism only to a limited extent will be driven over the second range of revolutions, e.g. in the order of 10,000 cycles. In contrast, the first range of revolutions, which determines the braking action, will be used in the order of 1.000.000 cycles, in the presence of relatively high loads. By selecting two different ranges for these different circumstances of actuation, the actuating mechanism can be adapted better to the requirements of reliability and cost-effectiveness.

According to a preferred embodiment, the actuating mechanism comprises two actuators, one actuator being for displacing the pads towards and from each other for exerting a braking effect, and the other actuator being for wear compensation of the pads.

These actuators can be selected on the basis of the loadings and cycles to be expected. Preferably, they are driven by a single drive part.

In order to be able to withstand the high number of braking cycles, the single drive part is a rotatable drive part which engages the displaceable support member by means of a first actuator comprising a ramp raceway mechanism, which ramp raceway mechanism provides a linear movement of the displaceable support member over a first range of rotations, and a compensation movement of the displaceable support member over the second range of rotations.

A ramp raceway mechanism represents a sturdy and reliable means, fit for performing relatively small displacements in a high cycle duty environment. Relatively large displacements will not have to be dealt with by this mechanism, having regard to the compensation movement of the displaceable support member which compensates for the wear of the brake pads.

The ramp raceway mechanism may have a locking position, from which position a linear movement of the displaceable support member away from the rotatable part is obtained in response to a rotation in a first direction, and from which position a locking of the displaceable support member with respect to the rotatable part is obtained in response to a rotation in the opposite direction.

Furthermore, the displaceable support member may engage a second actuator comprising a nut, which nut engages the rotatable part by means of the ramp raceway mechanism, and a screw which is connected to one of the brake pads and engaging the nut by means of screw threads which provide for a brake pad wear compensation displacement of the screw upon rotation of the nut from its locking position with respect to the rotatable part of the motor in response to said rotation in opposite direction.

In this embodiment, the wear compensation displacement is obtained by means of the relative rotations between the nut/screw mechanism. Such mechanism is particularly fit for providing large displacements. On the other hand, it is not necessary for this mechanism to withstand high cycle duties, as it will be activated much less than the brake mechanism and will not be used for effecting a braking action.

The nut engages the housing, connected to the yoke, by means of a one-way locking mechanism which locks the nut against rotations over the first range, and which allows rotations over the second range; for instance, the nut engages the housing by means of a ratchet pawl mechanism.

According to a preferred embodiment of the ramp raceway mechanism, the rotatable part and the displaceable support member have facing radial surfaces, each comprising three ramps, a roller being clamped between each opposing pair of said ramps.

Each ramp at its lowest region has a stop for locking the associated roller against further rotations. It is also possible to connect both parts in a different way, e.g. by means of pegs or ridges.

In order to obtain reliable information concerning the air gap between air pads and brake disc, it is desirable to establish the point of contact between said components. To that end, preferably one of the brake pads is connected to a load cell.

Alternatively, the measurement can be carried out optically.

Once the load cell establishes a loss of contact between brake pads and brake disc, the count of revolutions of the actuator is started. The differences from said starting point up to the point of the rest position then provides the desired information concerning the air gap.

Preferably, the actuating mechanism comprises an electric motor.

The invention is furthermore related to a method for operating the brake calliper, comprising the steps of monitoring the rotary movement of the actuating mechanism in the range of rotations for displacing the brake pads towards respectively from each other for exerting a braking effect on an associated brake disc respectively releasing said braking effect, comparing an actual value related to the maximal number of rotations in said range of rotations with a threshold value, controlling the actuating mechanism so as to make it to rotate outside said range of rotation, in order to compensate for wear, once the actual value has become larger than the threshold value.

Finally, the invention is also related to an actuator in general, comprising a frame carrying two members which can be brought into and out of mechanical contact with each other and an actuating mechanism connected to said frame, said actuating mechanism engaging a displaceable support member and being driveable over a range of rotating for displaying the members towards and from each other. Such actuator may be used in the brake calliper as described before, but alternatively also in a mechanical clutch.

According to the invention, for wear compensation of said elements, the actuating mechanism is also rotatable outside said range of rotations for displacing the members towards and from each other. For instance, the wear of the clutch plates may be compensated for in this way.

BRIEF DESCRIPTION OF THE DRAWINGS

Subsequently, the invention will be explained with reference to an embodiment of the electromechanical brake with wear compensation as shown in the figures.

DETAILED DESCRIPTION OF THE PREFERRED EMBODIMENTS

Figure 1:
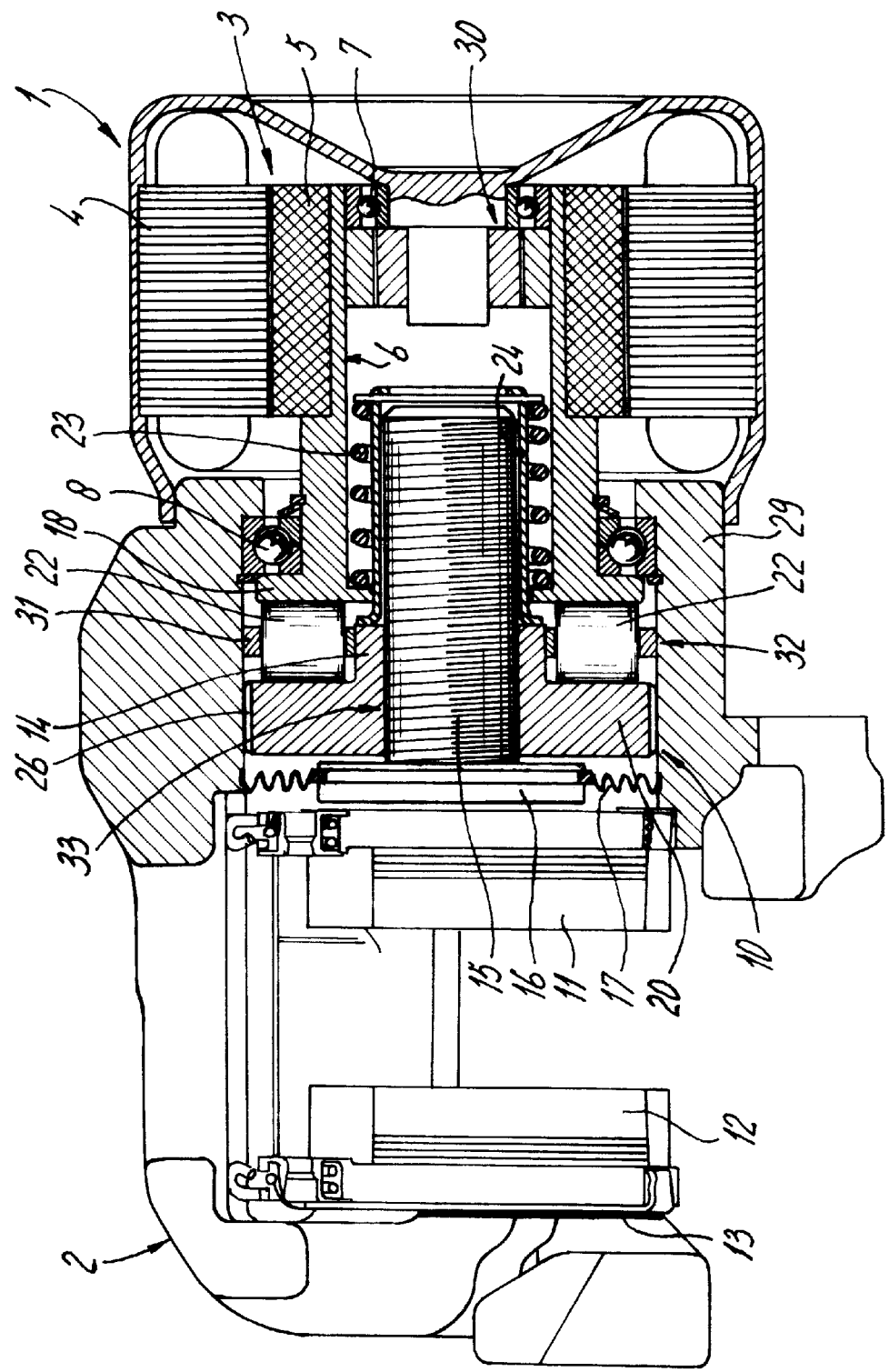
FIG. 1 shows a side view, partially in cross-section, of the electro-mechanical brake according to the invention.
Figure 2:
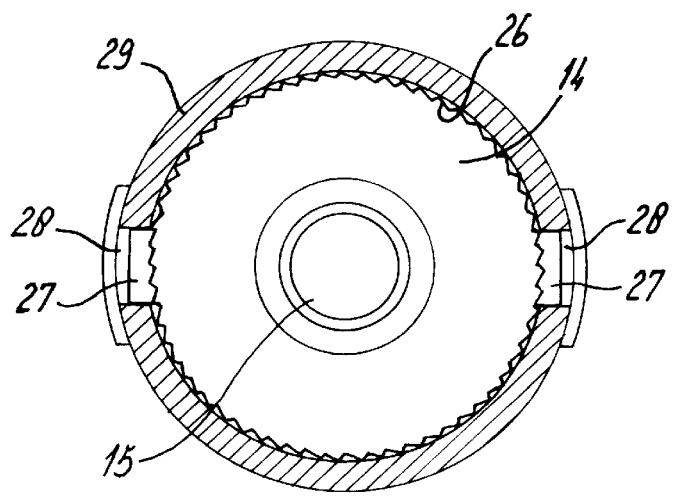
FIG. 2 shows a cross-section according to II—II in FIG. 1.

The brake calliper shown in FIG. 1 comprises a housing 1 connected to a yoke 2. The housing contains an electric motor 3, the stator 4 of which is connected to the housing 1, 29, and the rotatable part 5 of which is supported on support piece 6. Support piece 6 is rotatably supported in the housing by means of bearing 7 as well as four-point contact bearing 8. This bearing 8 may have asymmetric working lines.

Support piece 6 is part of a first mechanical actuator 32, which engages a displaceable support member 10 which carries one of the brake pads 11. The other brake pad 12 is connected to the yoke with possible interposition of load cell 13.

The displaceable support member 10 furthermore engages a second mechanical actuator 33, which comprises a nut 14 which by means of screw thread co-operates with screw 15. Screw 15 has a head 16 at its side which emerges from the screw 15, onto which head the brake pad 11 is supported. By means of a flexible bellows 17, the space containing the actuator and the electric motor 3 is sealed with respect to the outside.

For effecting a braking movement of the brake pads 11, 12, i.e. a movement towards each other, the first actuator 32 comprises a ramp raceway mechanism. To that end, rotatable support piece 6 has a ring 18 which has a first set of three ramps 19. Furthermore, displaceable support member 10 has a ring 20 which also has a set of three ramps 21. Between the ramps 19, 21, rollers 22 are held under pretension by means of spring 23 which on the one hand bears against ring 18, and on the other hand against pulling member 24 connected to displaceable support member 10.

Upon rotation of the rotatable part 5 of electric motor 3 over a first range of rotations, i.e. in the figures shown according to a right hand turn, the distance between ring 18 of rotatable support piece 6 and ring 20 of displaceable support member 10 is increased due to the rolling movement of the rollers 22 over the ramp raceways 19, 21. In FIG. 1, displaceable support member 10 is thereby translated to the left, pressing the brake pads 11, and 12 towards one another for obtaining a braking effect with respect to a brake disc (not shown) accommodated between them.

Generally, in an ideal situation, the distance over which the brake pads 11, 12 have to be moved towards one another, is small, e.g. in the order of 0.2 mm. However, as soon as wear of the brake pads takes place, gradually this distance becomes larger leading to less favourable braking behaviour due to for instance longer response times. Moreover, the ramp raceway mechanism in question can only accommodate translations up to a relatively small maximum distance, which means that after somewhere has taken place, compensation must take place.

Figure 3:
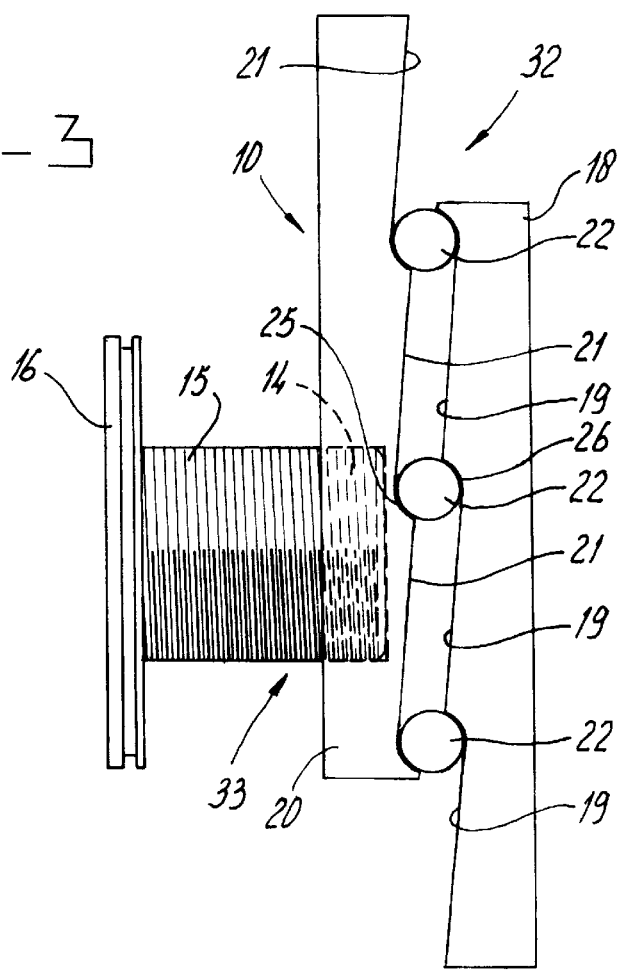
FIG. 3 shows a detail about the ramp raceway mechanism.

In the brake calliper as shown in the figures, brake pad wear compensation is effected by means of the second mechanical actuator 33, comprising a screw 15 and nut 14. This nut forms an integral piece with displaceable support member 10. As shown in FIG. 3, the ramp raceways 19 and 21 each terminate in a locking part 25 respectively 26. In a rest position of the brake calliper, the rings 18, 20 have reached such a position that the rollers 22 are clamped between the locking parts 25, 26. Upon further rotation of the rotatable support piece 6 by the electric motor 3 in left hand direction, ring 18 and thereby nut 14 is also rotated in left hand direction. Thus, nut 14 exerts a translational effect to the left on screw 15, whereby brake pad 11 is moved towards brake pad 12 for compensating the wear which has occurred. After wear compensation, the first actuator 32 is in the desired position for effecting a braking action, now starting from a desired, relatively small air gap.

In order to ensure that nut 14 only rotates in left hand direction, as seen in FIGS. 1 and 3, it has a ratchet teeth 26 at its circumference, which co-operate with correspondingly shaped pawls 27. Pawls 27 are held under pretension against the ratchet teeth 26 by means of flexible elements 28, which are held clamped within the ring part 29 of the housing 1.

The pretension in combination with the geometry of the pawl-ratchet mechanism determines the torque required for activation of the second actuator.

As a further possibility, the brake calliper comprises a sensor 30 having pulse rings which register the amount of rotation of the rotatable support piece 6. On the basis of information obtained from this sensor 30, the electric motor 3 can be controlled in such a way that the desired braking action is obtained. This sensor may serve basic functions such as giving information wear compensation, maintenance indication, brake force feedback (ABS), traction control and for vehicle dynamic functions.

Rollers 22 are accommodated in a cage 31, so as to keep them in their proper position with respect to each other and with respect to the ramp raceways 19, 21.

It is observed that the second actuator could also be operated manually.

What is claimed is:

1. A brake calliper for a disc brake, comprising:
   a yoke;
   a pair of opposing brake pads supported by said yoke;
   an actuating mechanism;
   a displaceable support member;
   wherein the actuating mechanism is rotated through a first range of rotations, the first range of rotations having a starting rotation in one direction to displace each of said pair of opposing brake pads towards and away from each other to exert a braking effect on said disc; and
   wherein the actuating mechanism is rotated through a second range of rotations having a starting rotation in a direction opposite to said first range of rotations, to move each of said pair of opposing brake pads toward each other, incrementally, to compensate for reduced brake pad thickness due to wear.

2. A brake calliper according to claim 1, wherein the actuating mechanism comprises two actuators, a first actuator to displace each of said pair of opposing brake pads towards and away from each other to exert a braking effect, and a second actuator to move each of said pair of opposing brake pads toward each other, incrementally, to compensate for reduced brake pad thickness due to wear.

3. A brake calliper according to claim 2, wherein the first and second actuators have a common drive part, the first actuator is activatable by rotation of said drive part in one direction, and the second actuator is activatable by rotation of said drive part in the opposite direction.

4. A brake calliper according to claim 2, wherein the first actuator and the second actuator are controlled independently from each other.

5. A brake calliper according to claim 1, further comprising:
   a ramp raceway mechanism; and
   wherein the actuating mechanism comprises a rotatable drive part which engages the displaceable support member by means of the ramp raceway mechanism to provide a linear movement of the displaceable support member due to a first rotation, and a compensation movement of the displaceable support member due to a second rotation.

6. A brake calliper according to claim 5, wherein the ramp raceway mechanism has a locking position, from which position a linear movement of the displaceable support member away from the rotatable part is obtained in response to a rotation in a first direction, and from which position a locking of the displaceable support member with respect to the rotatable part is obtained in response to a rotation in the opposite direction.

7. A brake calliper according to claim 6, wherein the displaceable support member engages the second actuator comprising a nut which engages the rotatable part by means of the ramp raceway mechanism, and a screw which is connected to one of the brake pads and engaging the nut by means of screw threads which provide for a brake pad wear compensation displacement of the screw upon rotation of the nut from its locking position with respect to the rotatable part in response to said rotation in opposite direction.

8. A brake calliper according to claim 7, wherein the nut engages a housing, connected to the yoke, by means of a one-way locking mechanism which locks the nut against rotations for obtaining a braking effect, and which allows rotations for obtaining a compensation effect.

9. A brake calliper according to claim 8, wherein the nut engages the housing by means of a ratchet pawl mechanism.

10. A brake actuator calliper according to claim 5, wherein the rotatable part and the displaceable support member have facing radial surfaces, each comprising three ramps, a roller being clamped between each opposing pair of said ramps.

11. A brake calliper according to claim 10, wherein each ramp at its lowest region has a stop for locking the associated roller against further rotations.

12. A brake calliper according to claim 10, wherein a spring is provided for preloading the ramps and the rollers.

13. A brake calliper according to claim 5, wherein the rotatable part is supported with respect to the housing by at least one angular contact bearing.

14. A brake calliper according to claim 1, wherein one of brake pads is connected to a load cell.

15. A brake calliper according to claim 5, wherein the rotatable part is a component of, or is driveably connected to, an electric motor, the electric motor having a stator which is connected to the yoke.

16. A brake calliper according to claim 1, wherein a sensor is provided for sensing the rotary movement of the actuating mechanism.

17. A brake calliper according to claim 16, comprising a control unit for controlling an electric actuating mechanism on the basis of signals from the sensor and a brake signal.

* * * * *